(12) United States Patent
Hartmann et al.

(10) Patent No.: US 10,436,366 B2
(45) Date of Patent: Oct. 8, 2019

(54) PLUG-IN CONNECTOR ASSEMBLY FOR THE CONNECTION OF LINES

(71) Applicant: Henn GmbH & Co KG., Dornbirn (AT)

(72) Inventors: Harald Hartmann, Dornbirn (AT); Christian Hubmann, Hohenems (AT)

(73) Assignee: Henn GmbH & Co KG., Dornbirn (AT)

( * ) Notice: Subject to any disclaimer, the term of this patent is extended or adjusted under 35 U.S.C. 154(b) by 48 days.

(21) Appl. No.: 15/555,124

(22) PCT Filed: Feb. 26, 2016

(86) PCT No.: PCT/AT2016/050045
§ 371 (c)(1),
(2) Date: Sep. 1, 2017

(87) PCT Pub. No.: WO2016/138548
PCT Pub. Date: Sep. 9, 2016

(65) Prior Publication Data
US 2018/0038535 A1    Feb. 8, 2018

(30) Foreign Application Priority Data
Mar. 3, 2015  (AT) .................................. 50165/2015

(51) Int. Cl.
*F16L 37/088* (2006.01)
*F16L 33/213* (2006.01)
*F16L 37/086* (2006.01)

(52) U.S. Cl.
CPC ........... *F16L 37/088* (2013.01); *F16L 33/213* (2013.01); *F16L 37/086* (2013.01)

(58) Field of Classification Search
CPC ....................................................... F16L 37/088
(Continued)

(56) References Cited

U.S. PATENT DOCUMENTS 3,521,911 A * 7/1970 Hanes .................. E21B 17/085
285/27
8,997,328 B2    4/2015 Hartmann et al.
(Continued)

FOREIGN PATENT DOCUMENTS

| AT | 509 561 B1 | 9/2011 |
| AT | 512 397 B1 | 8/2013 |

(Continued)

OTHER PUBLICATIONS

International Search Report of PCT/AT2016/050045, dated Jul. 15, 2016.

*Primary Examiner* — James M Hewitt, II
(74) *Attorney, Agent, or Firm* — Collard & Roe, P.C.

(57) ABSTRACT

A plug-in connector assembly for connecting lines for pressurized fluids includes a plug-in connector receptacle having a plug-in opening on a plug-in side, in which plug-in opening a receiving cutout is arranged, a plug-in connector with a plug-in section which can be plugged into the plug-in opening of the plug-in connector receptacle, and a locking spring which is arranged on the plug-in connector receptacle. An anti-rotation element is insertable into the receiving cutout of the plug-in connector receptacle and can be accommodated therein in a fixed manner. The plug-in connector has on its outer side an anti-rotation groove extending in the longitudinal direction, which forms along with the anti-rotation element tongue and groove connection, such that the plug-in connector is secured against rotation relative to the plug-in connector receptacle.

10 Claims, 6 Drawing Sheets

Figure 1:
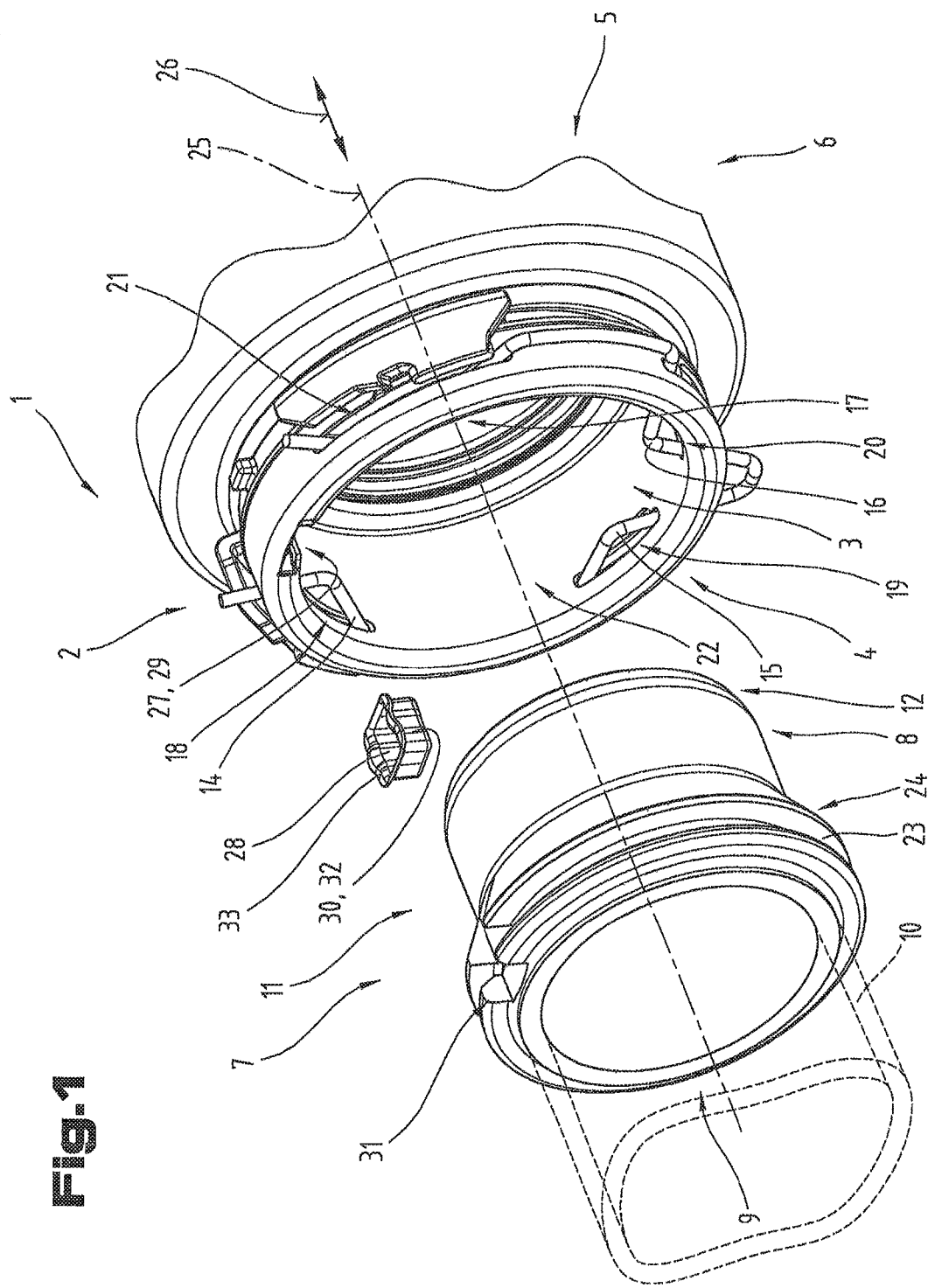

(58) Field of Classification Search
USPC .......................................................... 285/91
See application file for complete search history.

(56) References Cited

U.S. PATENT DOCUMENTS

| | | |
|---|---|---|
| 9,657,878 B2 | 5/2017 | Hartmann |
| 2005/0136741 A1 | 6/2005 | Yoshida et al. |
| 2009/0102181 A1* | 4/2009 | Hartmann ............. F16L 37/088 285/26 |
| 2013/0009393 A1* | 1/2013 | Hartmann ............. F16L 13/147 285/45 |
| 2013/0140808 A1* | 6/2013 | Bongiorni ............... F16L 21/08 285/81 |

FOREIGN PATENT DOCUMENTS

| | | | | |
|---|---|---|---|---|
| AT | 517085 A4 * | 11/2016 | ............ | F16L 37/088 |
| DE | 196 23 448 A1 | 5/1997 | | |
| DE | 10247684 A1 * | 4/2004 | ............ | F16L 37/252 |
| DE | 10 2012 006 443 A1 | 10/2012 | | |
| DE | 10 2011 115 401 A1 | 4/2013 | | |
| EP | 2 565 509 A1 | 3/2013 | | |
| JP | 2009-144755 A | 7/2009 | | |
| WO | 2011/106805 A1 | 9/2011 | | |
| WO | WO-2011140280 A2 * | 11/2011 | ............ | F16L 37/088 |

* cited by examiner

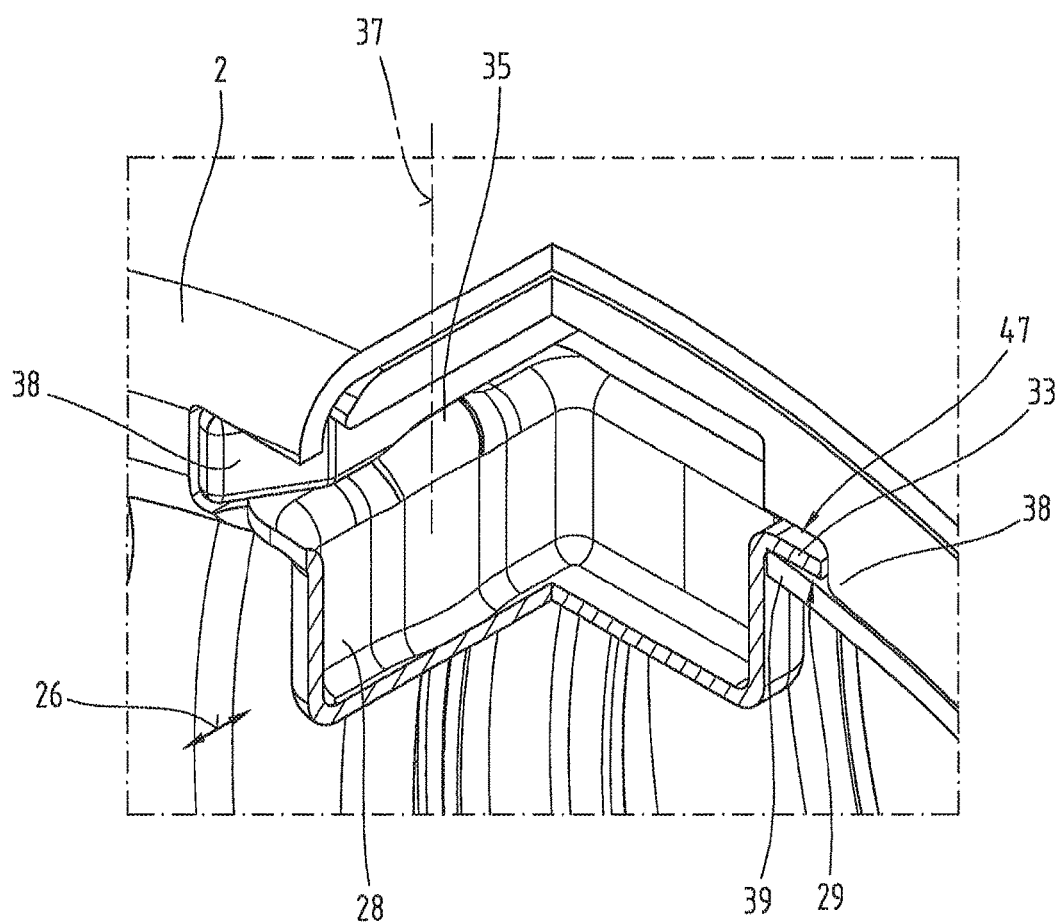

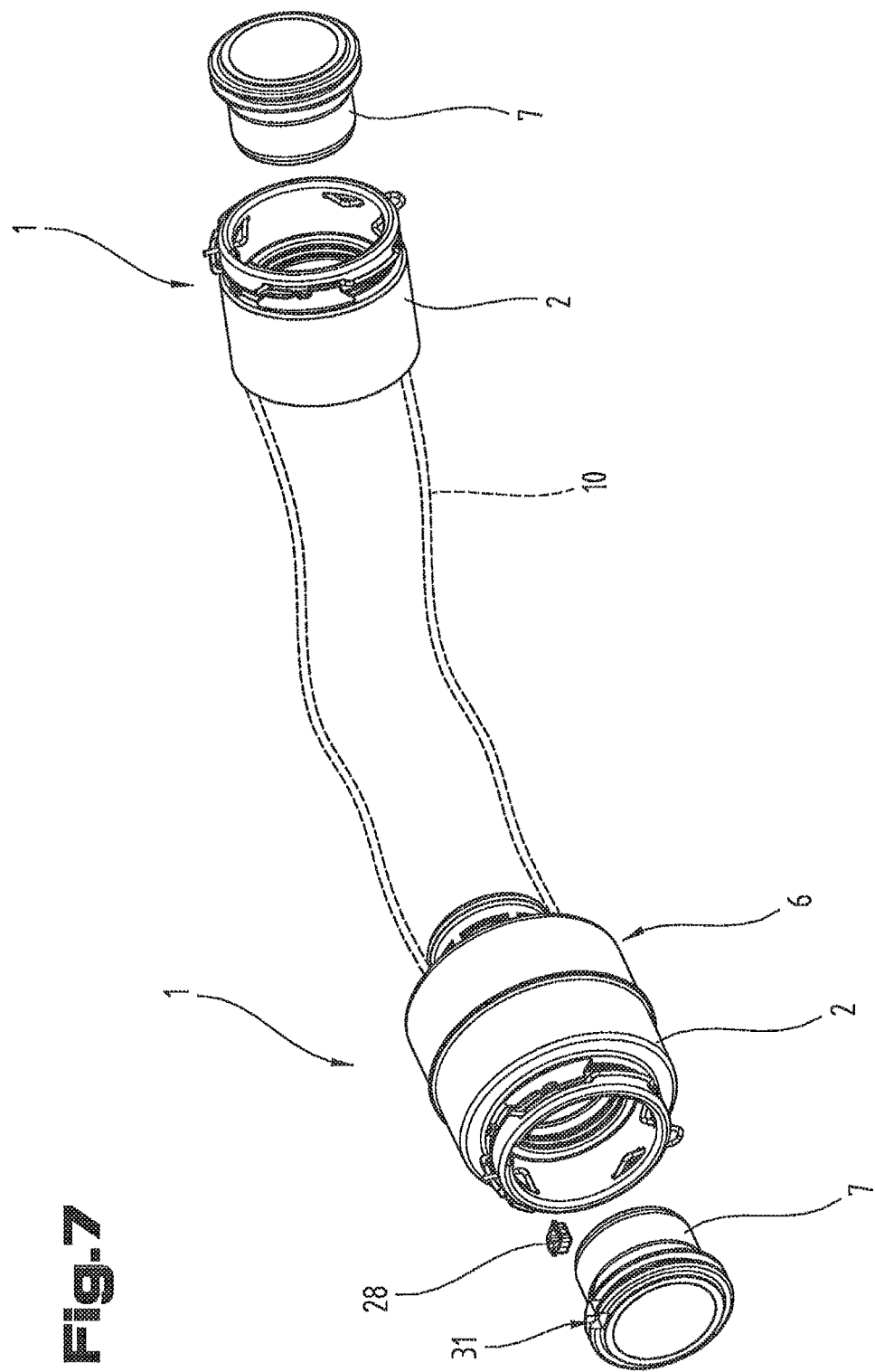

PLUG-IN CONNECTOR ASSEMBLY FOR THE CONNECTION OF LINES

CROSS REFERENCE TO RELATED APPLICATIONS

This application is the National Stage of PCT/AT2016/050045 filed on Feb. 26, 2016, which claims priority under 35 U.S.C. § 119 of Austrian Application No. A 50165/2015 filed on Mar. 3, 2015, the disclosure of which is incorporated by reference. The international application under PCT article 21(2) was not published in English.

The invention relates to a plug-in connector assembly for connecting lines for pressurized fluids.

A plug-in connector assembly of the generic type is known from AT 509 561 B1, which discloses a plug-in connector receptacle and a plug-in connector which can be plugged into the plug-in connector receptacle. In order to prevent the plug-in connector from being plugged into the plug-in connector receptacle, a blocking body is provided which can be inserted in a receiving cutout in the plug-in connector receptacle.

Another plug-in connector assembly is known from AT 512 397 B1.

The objective of this invention is to propose a plug-in connector assembly which offers the possibility of securing the plug-in connector in order to prevent any rotation relative to the plug-in connector receptacle if necessary.

This objective of the invention is achieved by means of the features defined in claim 1.

A plug-in connector assembly is proposed by the invention as a means of connecting lines for pressurized fluids. The plug-in connector assembly comprises a plug-in connector receptacle having a plug-in opening on a plug-in side, in which plug-in opening a receiving cutout is arranged. The plug-in connector assembly further comprises a plug-in connector with a plug-in section which can be plugged into the plug-in opening of the plug-in connector receptacle, and when assembled with the plug-in connector, the plug-in opening of the plug-in connector receptacle surrounds at least certain regions of the plug-in section of the plug-in connector. The plug-in connector assembly also comprises a locking spring which is arranged on the plug-in connector receptacle and locates in a radially extending groove in an outer side of the plug-in connector by means of at least one retaining section in a closed position, thereby preventing the plug-in connector inserted in the plug-in connector receptacle from working loose. Furthermore, an anti-rotation element can be inserted in the receiving cutout of the plug-in connector receptacle and can be accommodated therein in a fixed manner. The plug-in connector has on its outer side an anti-rotation groove extending in the longitudinal direction which forms, together with the anti-rotation element, a tongue and groove connection such that the plug-in connector is secured against rotation relative to the plug-in connector receptacle.

One advantage of the design of the plug-in connector assembly proposed by the invention resides in the fact that the anti-rotation element can be selectively inserted in the plug-in connector receptacle. When an anti-rotation element is inserted in the plug-in connector receptacle, it establishes a tongue and groove connection in conjunction with the plug-in connector, thereby enabling the angular position of the plug-in connector to be predetermined and fixed relative to the plug-in connector receptacle. One advantage of providing an anti-rotation groove in the plug-in connector resides in the fact that the plug-in connector can be easily manufactured on a mass-produced basis, and simply involves providing the anti-rotation groove in the plug-in connector. Furthermore, relatively high torques can be transmitted via the anti-rotation groove and/or the anti-rotation element inserted in the plug-in connector receptacle. In addition, plug-in connectors can be produced with or without an anti-rotation groove by making only a slight modification to the manufacturing tool.

It may also be of practical advantage if the receiving cutout in the plug-in opening of the plug-in connector receptacle is provided in the form of a T-shaped groove extending in the longitudinal direction, and the anti-rotation element can be inserted in the receiving cutout on the plug-in side of the plug-in connector receptacle and accommodated therein in a form-fitting arrangement. The advantage of this is that the anti-rotation element can be easily inserted in the T-shaped groove. Due to the form-fitting connection obtained between the plug-in connector receptacle and anti-rotation element by means of the T-shaped groove, the anti-rotation element can be held as firmly as possible in the plug-in connector receptacle.

Furthermore, the anti-rotation element may have a locking projection and can be secured in a locking position in the receiving cutout when pushed in the longitudinal direction. The advantage of this is that the anti-rotation element can be secured by means of the locking projection to prevent it from falling out of the plug-in connector receptacle. Furthermore, when the anti-rotation element is being inserted in the plug-in connector receptacle, the user has feed-back about whether the anti-rotation element has reached the correct end position or locking position due to the locking projection.

Furthermore, an insert element is disposed in the receiving cutout of the plug-in connector receptacle which co-operates with the locking projection of the anti-rotation element and acts as a locking projection counterpart. The advantage of this is that the exact locking position can be defined by the insert element and/or the retaining force or latching force of the anti-rotation element can be defined by the insert element.

Also of advantage is an embodiment in which the insert element may be made from a plastics material. An insert element made from a plastics material can be easily and inexpensively made by a production process suitable for manufacture on a large scale. Furthermore, an insert element made from a plastics material has good properties in terms of elasticity and is therefore particularly suitable for use in a latching mechanism.

It may also be of practical advantage if the anti-rotation element is a formed sheet metal part. The advantage of this is that the anti-rotation element can be readily made by a process suitable for mass production. Furthermore, an anti-rotation element in the form of a formed sheet metal part will exhibit high strength, thereby reducing the risk of the anti-rotation element breaking.

The anti-rotation element may also be provided in the form of a cup with a flange. The advantage of this is that the anti-rotation element can be easily inserted in the plug-in connector receptacle and the anti-rotation element can be manipulated as easily as possible. In addition, such an anti-rotation element can be easily made by a deep-drawing process.

In addition, the plug-in connector receptacle may be provided in the form of a formed sheet metal part and the receiving cutout can be produced by a punching process. The advantage of this is that the plug-in connector receptacle will have a high strength and is easy to produce.

Furthermore, the receiving cutout may be partially disposed in an internal wall and/or in an end wall of the plug-in connector receptacle, in which case the T-shaped groove is disposed between the internal wall and external wall of the plug-in connector receptacle. The advantage of this is that such a T-shaped groove is easy to produce.

Finally, the plug-in connector receptacle is provided in the form of an integral part of an automotive muffler. The advantage of this is that the automotive muffler therefore has a feature whereby a plug-in connector can be directly connected.

To provide a clearer understanding, the invention will be described in more detail with reference to the appended drawings.

Figure 2:
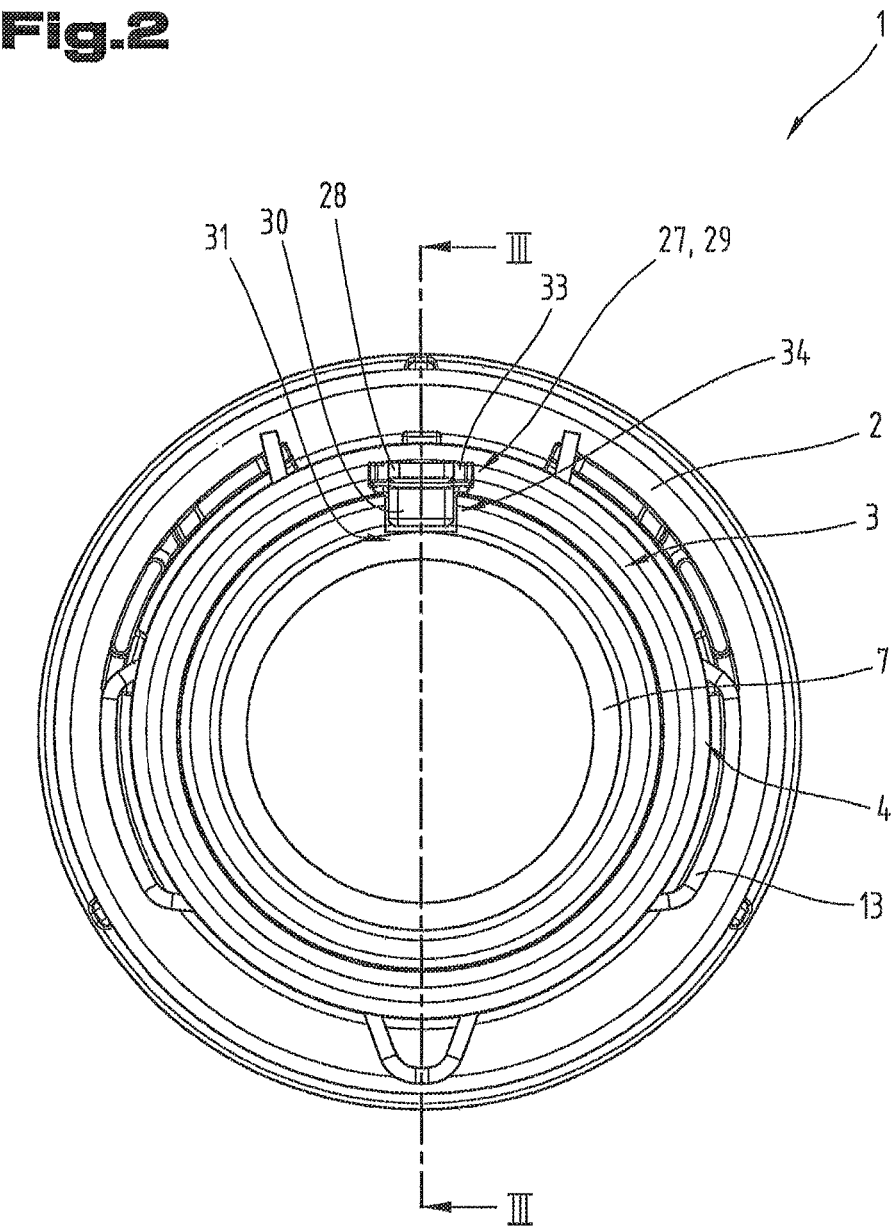
Figure 3:
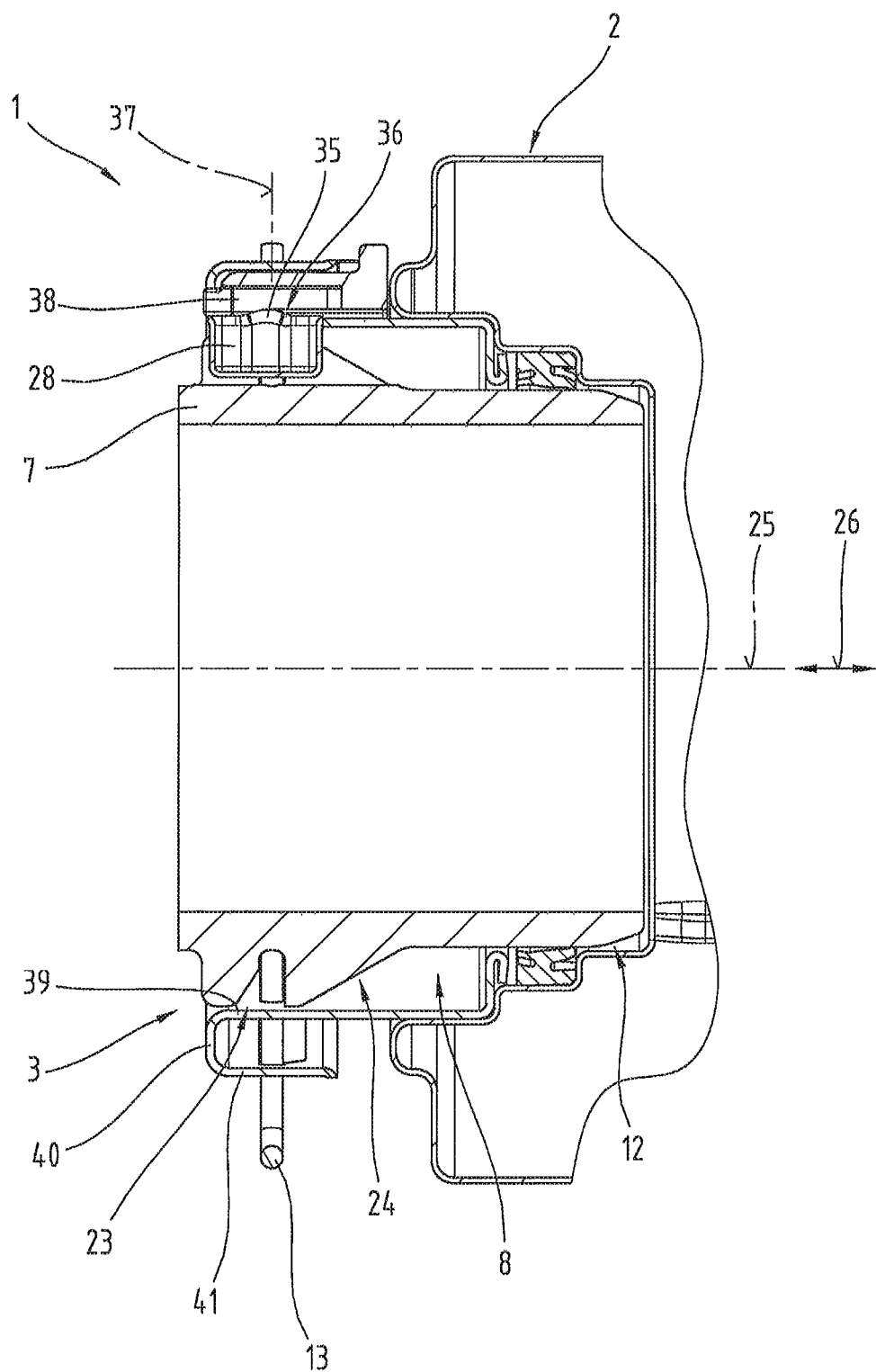
Figure 4:
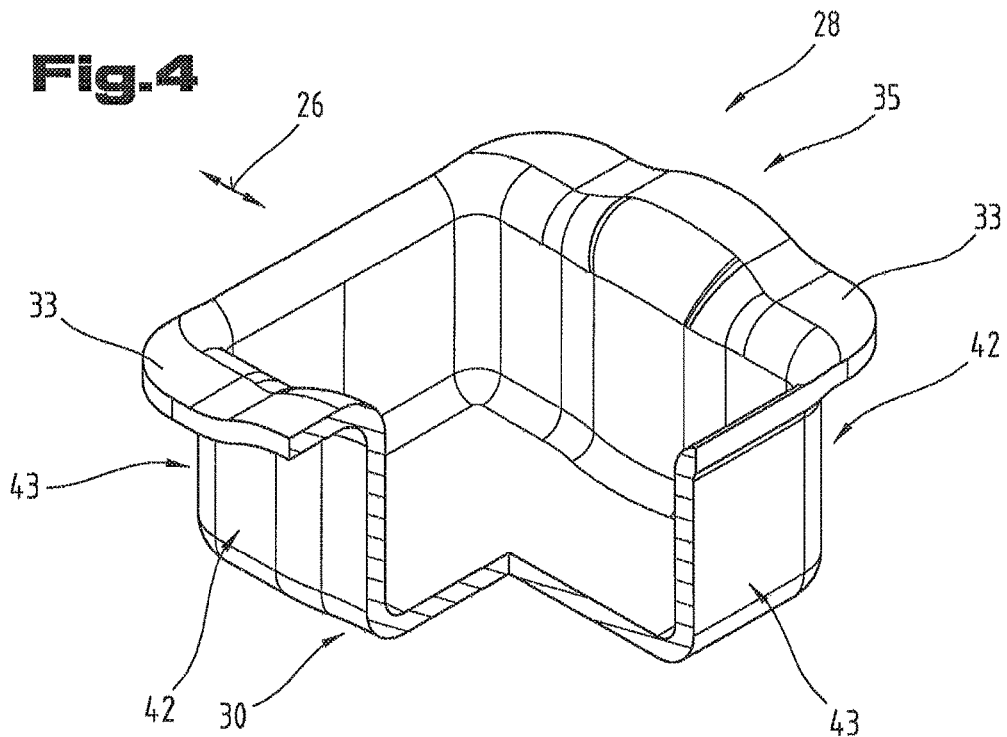
Figure 5:
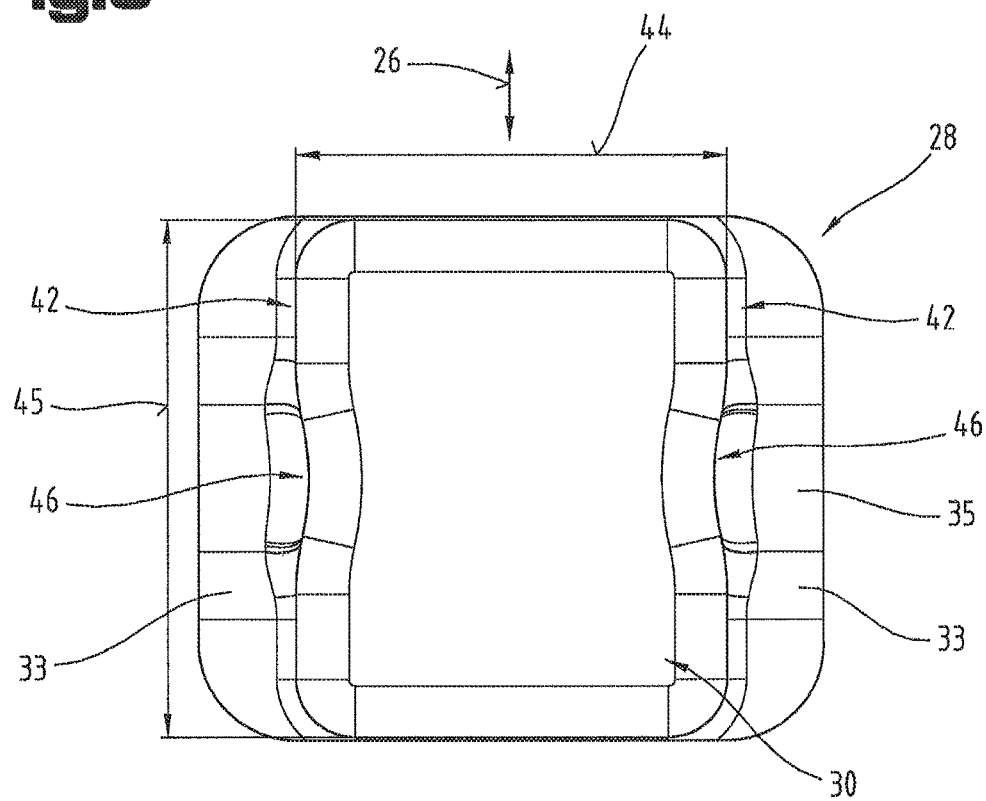

These are highly simplified, schematic diagrams illustrating the following:

FIG. 1 an exploded diagram illustrating a perspective view of a plug-in connector assembly;

FIG. 2 a side view of the plug-in connector assembly in the assembled state;

FIG. 3 a cross-section of the plug-in connector assembly in the assembled state, in particular along section line III-III indicated in FIG. 2;

FIG. 4 a diagram showing a perspective view of an anti-rotation element in partial cross-section;

FIG. 5 a view of the anti-rotation element from underneath;

FIG. 6 a diagram showing a perspective view of the plug-in connector assembly in partial cross-section but without the plug-in connector;

FIG. 7 a perspective view of the plug-in connector assembly in the fitted state.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described.

FIG. 1 is a perspective view of a plug-in connector assembly 1 but in a non-assembled state with a view to showing the individual components and how they fit together.

The plug-in connector assembly 1 comprises a plug-in connector receptacle 2 having a plug-in opening 3 disposed on a plug-in side 4. A line side 5 disposed axially opposite the plug-in side 4 may be of various different types.

For example; it would be conceivable to fit a pressure line for conveying a fluid on the line side 5, in particular a pressurized fluid.

Based on an alternative embodiment, an automotive muffler 6 may be attached to the line side 5 or the plug-in connector receptacle 2 is an integral part of an automotive muffler 6.

Such a plug-in connector assembly 1 may be used in the charge air flow of an automotive vehicle, for example.

The plug-in connector assembly 1 further comprises a plug-in connector 7 having a plug-in section 8 and an attachment end 9 lying axially opposite. An elastic connecting hose 10 can be provided on the attachment end 9 of the plug-in connector 7, for example, and attached to the plug-in connector 7.

Alternatively, it may be that the plug-in connector 7 is rigidly connected to a component in the compressed air chain at its attachment end 9, such as a turbocharger, for example.

The plug-in connector 7 can be plugged into the plug-in opening 3 of the plug-in connector receptacle 2 by means of its plug-in section 8. To make the plugging operation easier, the plug-in section 8 of the plug-in connector 7 may be provided with a chamfer 12 on an outer side 11.

To enable the plug-in connector 7 plugged into the plug-in connector receptacle 2 to be locked in the plug-in connector receptacle 2 to prevent the plug-in connector 7 falling out of the plug-in connector receptacle 2, a locking spring 13 is provided in the plug-in connector 7 which can be moved into engagement with the plug-in connector 7.

To this end, the locking spring 13 has at least one fixing piece which engages with the plug-in connector 7 when the locking spring 13 is in the closed position, thereby preventing it from becoming detached.

In particular, as may be seen from FIG. 1, when the locking spring 13 is in a closed position, a number of fixing pieces 14, 15, 16, 17 respectively extend into a slot 18, 19, 20, 21 extending radially around a partial section of the plug-in connector receptacle 2 in an inner region 22 of the plug-in connector receptacle 2, thereby forming a number of retaining sections.

In alignment with the fixing pieces 14, 15, 16, 17 on the outer side 11 of the plug-in connector 7 is a groove 23 extending radially in at least certain regions which lies in a same plane as the slots 18, 19, 20, 21 of the plug-in connector receptacle 2 when the plug-in connector 7 is fully plugged into the plug-in connector receptacle 2. Accordingly, the fixing pieces 14, 15, 16, 17 of the closed locking spring 13 extend completely through the slots 18, 19, 20, 21 and locate in the radially extending groove 23 of the plug-in connector 7 provided in at least certain regions. This prevents the plug-in connector 7 inserted in the plug-in connector receptacle 2 from becoming detached.

That the groove 23 is provided in at least certain regions should be understood as meaning that it may be provided only in the region of the fixing pieces 14, 15, 16, 17, for example, and the rest of the plug-in connector 7 is not provided with a groove 23. Alternatively, the groove 23 may extend circumferentially around the entire plug-in connector 7.

A radially extending lead-in bevel 24 may be provided for the fixing pieces 14, 15, 16, 17 of the locking spring 13 between the plug-in section 8 and the groove 23 of the plug-in connector 7 directly in front of the groove 23, which lead-in bevel 24 may constitute a side wall of the groove 23 and which lead-in bevel 24 moves or forces the fixing pieces 14, 15, 16, 17 of the closed locking spring 13 radially apart from one another as the plug-in connector 7 is inserted in the plug-in connector receptacle 2, thereby enabling the plug-in connector 7 to be inserted in the plug-in connector receptacle 2.

The locking spring 13 secures the plug-in connector 7, preventing it from sliding relative to the plug-in connector receptacle 2 in a longitudinal direction 26 extending parallel with the central axis 25. The locking spring 13 is not able to prevent the plug-in connector 7 and plug-in connector receptacle 2 rotating relative to one another about the central axis 25.

To prevent a relative rotation between the plug-in connector 7 and plug-in connector receptacle 2 about the central axis 25, a receiving cutout 27 is provided in the plug-in opening 3 of the plug-in connector receptacle 2 which can be used as an anti-rotation element 28. In particular, the receiving cutout 27 may be disposed in the inner region 22 of the plug-in opening 3. Furthermore, the receiving cutout 27 may be provided in the form of a T-shaped groove 29.

To enable the anti-rotation element 28 to be inserted by pushing it in the longitudinal direction 26 into the receiving cutout 27, the receiving cutout 27 is open at the plug-in side 4 so that the anti-rotation element 28 can be pushed in.

The anti-rotation element 28 has an anti-rotation body 30 which co-operates with an anti-rotation groove 31 in the plug-in connector 7. The anti-rotation element 28 may be a formed sheet metal part and in particular, the anti-rotation body 30 is provided in the form of a cup 32 to which a circumferentially extending or at least partially circumferentially extending flange 33 is attached. The flange 33 is designed to be pushed into the T-shaped groove 29 so that a form-fitting connection is established between the T-shaped groove 29 and anti-rotation element 28.

The individual components, in particular the plug-in connector receptacle 2, plug-in connector 7 and anti-rotation element 28, are illustrated in an exploded diagram in FIG. 1 and can be fitted to one another by pushing them in the longitudinal direction 26.

To enable the anti-rotation element 28 to be inserted in the receiving cutout 27, it may be necessary to use an appropriate tool for this purpose.

FIGS. 2 and 3 illustrate another and optionally independent embodiment of the plug-in connector assembly 1, the same reference numbers and component names being used to denote parts that are the same as those described with reference to FIG. 1 above. To avoid unnecessary repetition, reference may be made to the more detailed description of FIG. 1 above.

FIG. 2 is a side view illustrating the plug-in connector assembly 1 in a view towards the plug-in side 4. The plug-in connector assembly 1 is illustrated in the assembled state in this instance. As may be seen in this connected state, the anti-rotation element 28 in conjunction with the anti-rotation groove 31 disposed in the plug-in connector 7 constitute a tongue and groove connection 34 by means of which a relative rotation between the plug-in connector receptacle 2 and plug-in connector 7 can be prevented.

FIG. 3 illustrates a view of the plug-in connector assembly 1 in cross-section, in particular along section line III-III indicated in FIG. 2.

FIG. 3 illustrates the plug-in connector assembly 1 in the assembled state with the anti-rotation element 28 and plug-in connector 7 plugged into the plug-in connector receptacle 2. As illustrated, the anti-rotation element 28 may have a locking projection 35 which co-operates with a locking projection counterpart 36 and can thus be secured in a locking position 37. The purpose of providing a locking projection 35 is to ensure that the anti-rotation element 28 sits in as fixed a position as possible when it is inserted in the receiving cutout 27.

Furthermore, the plug-in connector receptacle 2 may comprise an insert element 38 constituting the locking projection counterpart 36. The insert element 38 is preferably made from a thermoplastic material, such as PP. This being the case, the insert element 38 may be manufactured by an injection casting process, for example.

In particular, the plug-in connector receptacle 2 may have an internal wall 39 in the region of the plug-in opening 3 and an end wall 40 adjoining it at an angle of 90° and an external wall 41 adjoining it at an angle of 90°. The external wall 41 therefore sits at an angle of 180° relative to the internal wall 39.

The insert element 38 may be disposed between the internal wall 39 and external wall 41, and the receiving cutout 27 is provided partially in the internal wall 39 and/or in the end wall 40 and the T-shaped groove 29 may form part of the insert element 38.

FIG. 4 is a perspective view illustrating one possible embodiment of the anti-rotation element 28, shown in partial section. The position of the anti-rotation element 28 is illustrated relative to the orientation of the longitudinal direction 26. In the assembled state, the side faces 42 engage with the anti-rotation groove 31. The end faces 43 face the plug-in side 4 and/or the line side 5 of the plug-in connector receptacle 2.

As may be seen from FIG. 4, a flange 33 is provided in the region of the side faces 42, by means of which the anti-rotation element 28 is accommodated in a form-fitting arrangement in the T-shaped groove 29.

The flange 33 may be disposed either in the region of the side faces 42 or, based on an alternative embodiment, it would be conceivable for the flange 33 to be provided in the form of a circumferentially extending flange.

As may be seen particularly clearly in FIG. 4, the locking projection 35 is provided on the flange 33 and/or is incorporated in it. The locking projection 35 may be provided in the form of a camber in the flange 33.

FIG. 5 is a view of the anti-rotation element 28 from underneath. As may be seen from FIG. 5, the anti-rotation body 30 has a width 44 and a length 45. The width 44 of the anti-rotation body 30 is adapted to the width of the anti-rotation groove 31. The width 44 of the anti-rotation body 30 is preferably selected so that the anti-rotation element 28 fits in the anti-rotation groove 31 with a clearance so that the anti-rotation element 28 can be easily pushed in the longitudinal direction 26 of the anti-rotation groove 31.

As may also be seen from FIG. 5, a tapered region 46 is provided in the region of the side faces 42.

FIG. 6 illustrates a perspective view of the plug-in connector assembly 1 in which the anti-rotation element 28 has already been inserted or fitted. In order to retain clarity, the plug-in connector 7 is not illustrated in this view. The plug-in connector receptacle 2 and the anti-rotation element 28 are illustrated in partial section.

In the diagram shown in FIG. 6, the anti-rotation element 28 is disposed in its locking position 37. As clearly illustrated in FIG. 6, the anti-rotation element 28 is accommodated in the T-shaped groove 29 of the plug-in connector receptacle 2, the T-shaped groove 29 being delimited in the interior by the internal wall 39 and on the exterior by the insert element 38. The gap 47 created as a result is used to accommodate the flange 33, thereby creating a form-fitting connection between the anti-rotation element 28 and plug-in connector receptacle 2. Furthermore, the anti-rotation element 28 is secured in the longitudinal direction 26 by the locking projection 35 so that it cannot fall out of the plug-in connector receptacle 2.

FIG. 7 illustrates one possible application in which a plug-in connector assembly 1 is fitted in an automotive vehicle.

As may be seen from FIG. 7, a plug-in connector receptacle 2 is disposed at both ends of a connecting hose 10 respectively. In addition, one of the plug-in connector receptacles 2 or both plug-in connector receptacles 2 may be an integral part of an automotive muffler 6. The or both plug-in connectors 7 may be rigidly connected to a component of the compressed air flow system.

To enable the connecting hose 10 to be secured to the two plug-in connector receptacles 2 connected to it so that it cannot become undesirably twisted, the anti-rotation element 28 may be inserted in one of the two plug-in connector receptacles 2. As illustrated in FIG. 7, the anti-rotation element 28 may be inserted in the plug-in connector receptacle 2 connected to the automotive muffler 6, for example.

The fact that the anti-rotation element 28 is inserted in only one of the plug-in connectors 2 prevents internal tension in the connecting hose 10. This is achieved due to the fact that the plug-in connector receptacle 2 in which the anti-rotation element 28 is not inserted is able to turn freely relative to the co-operating plug-in connector 7.

In addition, only one of the two plug-in connectors 7 has an anti-rotation groove 31. Since a plug-in connector receptacle 2 in which the anti-rotation element 28 is inserted can only be connected to a plug-in connector 7 which has an anti-rotation groove 31, the orientation of the connecting hose 10 can also be specifically fixed. If one were to attempt to connect a plug-in connector receptacle 2 in which an anti-rotation element 28 is inserted to a plug-in connector 7 which does not have an anti-rotation groove 31, the anti-rotation element 28 would collide with the radially extending lead-in bevel 24 of the plug-in connector 7 and it would not be possible to insert one inside the other.

Accordingly, this design of the anti-rotation element 28 and plug-in connector assembly 1 enables a connecting hose 10 to be fitted in an automotive vehicle in the correct angular position and in the correct orientation.

The embodiments illustrated as examples represent possible variants of the plug-in connector assembly 1, and it should be pointed out at this stage that the invention is not specifically limited to the variants specifically illustrated, and instead the individual variants may be used in different combinations with one another and these possible variations lie within the reach of the person skilled in this technical field given the disclosed technical teaching.

Furthermore, individual features or combinations of features from the different embodiments illustrated and described may be construed as independent inventive solutions or solutions proposed by the invention in their own right.

The objective underlying the independent inventive solutions may be found in the description.

All the figures relating to ranges of values in the description should be construed as meaning that they include any and all part-ranges, in which case, for example, the range of 1 to 10 should be understood as including all part-ranges starting from the lower limit of 1 to the upper limit of 10, i.e. all part-ranges starting with a lower limit of 1 or more and ending with an upper limit of 10 or less, e.g. 1 to 1.7, or 3.2 to 8.1 or 5.5 to 10.

Above all, the individual embodiments of the subject matter illustrated in FIGS. 1, 2 to 3, 4, 5, 6, 7 constitute independent solutions proposed by the invention in their own right. The objectives and associated solutions proposed by the invention may be found in the detailed descriptions of these drawings.

For the sake of good order, finally, it should be pointed out that, in order to provide a clearer understanding of the structure of the of the plug-in connector assembly 1, it and its constituent parts are illustrated to a certain extent out of scale and/or on an enlarged scale and/or on a reduced scale.

| List of reference numbers | |
|---|---|
| 1 | Plug-in connector assembly |
| 2 | Plug-in connector receptacle |
| 3 | Plug-in opening |
| 4 | Plug-in side |
| 5 | Line side |
| 6 | Automotive muffler |
| 7 | Plug-in connector |
| 8 | Plug-in section |
| 9 | Attachment end |
| 10 | Connecting hose |
| 11 | Outer side plug-in connector |
| 12 | Chamfer |
| 13 | Locking spring |
| 14 | First fixing piece |
| 15 | Second fixing piece |
| 16 | Third fixing piece |
| 17 | Fourth fixing piece |
| 18 | First slot |
| 19 | Second slot |
| 20 | Third slot |
| 21 | Fourth slot |
| 22 | Inner region |
| 23 | Radially extending groove |
| 24 | Radially extending lead-in bevel |
| 25 | Central axis |
| 26 | Longitudinal direction |
| 27 | Receiving cutout |
| 28 | Anti-rotation element |
| 29 | T-shaped groove |
| 30 | Anti-rotation body |
| 31 | Anti-rotation groove |
| 32 | Cup |
| 33 | Flange |
| 34 | Tongue and groove connection |
| 35 | Locking projection |

The invention claimed is:

1. A plug-in connector assembly for connecting lines for pressurized fluids, comprising:

a plug-in connector receptacle having a plug-in opening on a plug-in side, in which plug-in opening a receiving cutout is arranged;

a plug-in connector with a plug-in section which can be plugged into the plug-in opening of the plug-in connector receptacle, and when assembled with the plug-in connector, the plug-in opening of the plug-in connector receptacle surrounds at least certain regions of the plug-in section of the plug-in connector;

a locking spring which is arranged on the plug-in connector receptacle and locates in a radially extending groove on an outer side of the plug-in connector by means of at least one retaining section in a closed position, thereby preventing the plug-in connector inserted in the plug-in connector receptacle from working loose; and an anti-rotation element configured to be inserted in the receiving cutout of the plug-in connector receptacle and configured to be accommodated therein in a fixed manner, wherein the plug-in connector receptacle, the plug-in connector and the anti-rotation element are individual components such that the anti-rotation element can be selectively inserted in the plug-in connector receptacle, and wherein in an assembled state, the anti-rotation element is inserted in the receiving cutout of the plug-in connector receptacle, wherein the receiving cutout is open at the plug-in side of the plug-in opening to enable the anti-rotation element to be inserted by pushing it into the receiving cutout in a longitudinal direction, wherein the receiving cutout in the plug-in opening of the plug-in connector receptacle is provided in the form of a T-shaped groove extending in the longitudinal direction, and the anti-rotation element can be inserted in the receiving cutout on the plug-in side of the plug-in connector receptacle and accommodated therein in a form-fitting arrangement, and wherein the plug-in connector has on its outer side an anti-rotation groove extending in the longitudinal direction which forms, together with the anti-rotation element, a tongue and groove connection such that the plug-in connector is secured against rotation relative to the plug-in connector receptacle.

2. The plug-in connector assembly according to claim 1, wherein the anti-rotation element has a locking projection and can be secured in a locking position in the receiving cutout when pushed in a longitudinal direction extending parallel with the central axis.

3. The plug-in connector assembly according to claim 2, wherein an insert element is disposed in the receiving cutout of the plug-in connector receptacle which co-operates with the locking projection of the anti-rotation element and acts as a locking projection counterpart.

4. The plug-in connector assembly according to claim 3, wherein the insert element is made from a plastics material.

5. The plug-in connector assembly according to claim 1, wherein the anti-rotation element is a formed sheet metal part.

6. The plug-in connector assembly according to claim 1, wherein the anti-rotation element is provided in the form of a cup with a flange.

7. The plug-in connector assembly according to claim 1, wherein the plug-in connector receptacle is provided in the form of a formed sheet metal part and the receiving cutout is produced by a punching process.

8. The plug-in connector assembly according to claim 1, wherein the receiving cutout is partially disposed in an internal wall and/or in an end wall of the plug-in connector receptacle, and the T-shaped groove is therefore disposed between the internal wall and external wall of the plug-in connector receptacle.

9. The plug-in connector assembly according to claim 1, wherein the plug-in connector receptacle is provided in the form of an integral part of an automotive muffler.

10. A plug-in connector assembly for connecting lines for pressurized fluids, comprising:
a plug-in connector receptacle having a plug-in opening on a plug-in side, in which plug-in opening a receiving cutout is arranged;
a plug-in connector with a plug-in section which can be plugged into the plug-in opening of the plug-in connector receptacle, and when assembled with the plug-in connector, the plug-in opening of the plug-in connector receptacle surrounds at least certain regions of the plug-in section of the plug-in connector;
a locking spring which is arranged on the plug-in connector receptacle and locates in a radially extending groove on an outer side of the plug-in connector by means of at least one retaining section in a closed position, thereby preventing the plug-in connector inserted in the plug-in connector receptacle from working loose; and
an anti-rotation element configured to be inserted in the receiving cutout of the plug-in connector receptacle and configured to be accommodated therein in a fixed manner;
wherein the plug-in connector has on its outer side an anti-rotation groove extending in the longitudinal direction which forms, together with the anti-rotation element, a tongue and groove connection such that the plug-in connector is secured against rotation relative to the plug-in connector receptacle;
wherein the anti-rotation element has a locking projection and can be secured in a locking position in the receiving cutout when pushed in a longitudinal direction extending parallel with the central axis; and
wherein an insert element is disposed in the receiving cutout of the plug-in connector receptacle which co-operates with the locking projection of the anti-rotation element and acts as a locking projection counterpart.

* * * * *